(No Model.)

M. B. WILLIAMS.
BASKET FOR MARKETING FRUIT.

No. 470,732. Patented Mar. 15, 1892.

Witnesses:
Walter S. Wood
Marian Longyear

Inventor.
Malcolm B. Williams
By Lucius C. West
Att'y.

UNITED STATES PATENT OFFICE.

MALCOLM B. WILLIAMS, OF KALAMAZOO, MICHIGAN.

BASKET FOR MARKETING FRUIT.

SPECIFICATION forming part of Letters Patent No. 470,732, dated March 15, 1892.

Application filed October 12, 1891. Serial No. 408,495. (No model.)

*To all whom it may concern:*

Be it known that I, MALCOLM B. WILLIAMS, a citizen of the United States, residing at Kalamazoo, county of Kalamazoo, State of Michigan, have invented a new and useful Basket for Marketing Fruit, of which the following is a specification.

This invention consists in a peculiarly-constructed basket, open at the bottom, so as to be filled through the bottom in order to present regular and uniform rows of peaches or other fruit at the openings in the top of the basket.

Figure 1:
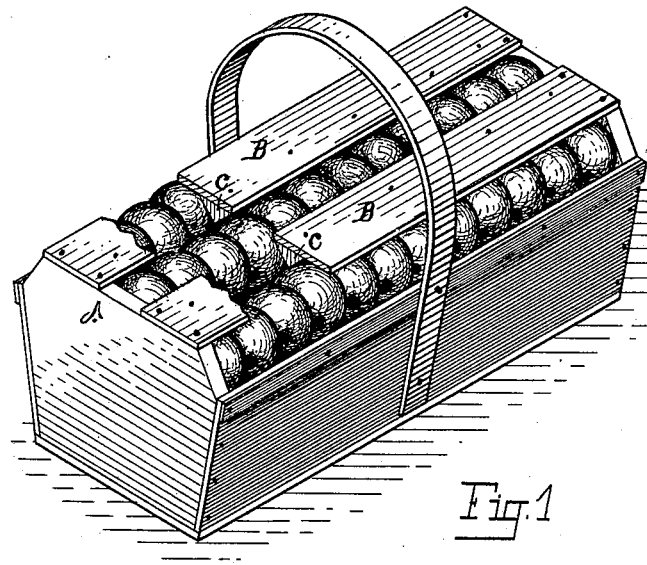
Figure 2:
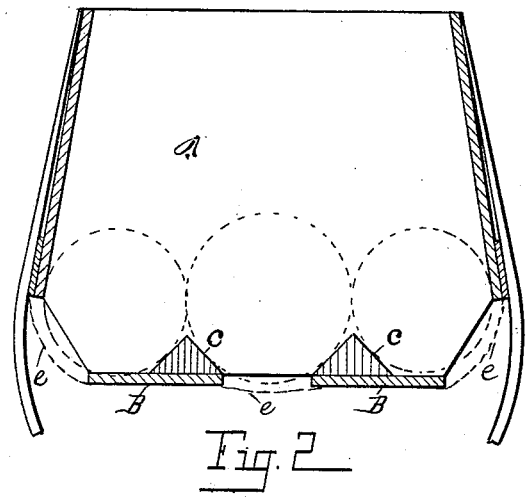

In the drawings forming a part of this specification, Figure 1 is a perspective view; and Fig. 2 is a cross-section on a line near the handle, enlarged, and showing the basket inverted.

The ends A of the basket extend above the sides. To these ends are attached longitudinal strips B B, separated from each other, so as to leave the central opening at the top for one row of fruit and two side openings at the top for two other rows of fruit. The top of the basket may have as many strips and openings as desired, only two strips and three openings being here shown. The openings in the top of the basket are closed by tarlatan or any other suitable netting, as indicated by dotted lines in Fig. 2 at E, and in some instances the entire top inclosure may consist of said tarlatan or netting. The under sides of these strips B B are provided with V-shaped cleats c to form separations between the rows of fruit, as clearly shown in Fig. 2, in which figure the fruit is shown in dotted lines. In lieu of making these cleats V-shaped, they may be made in any suitable shape.

The basket is constructed with the bottom open, and in the operation of filling said basket is inverted, as in Fig. 2, and filled with fruit, which fruit, owing to the peculiar construction of the basket, assumes a position in uniform order in rows along the openings at the top of the basket, or what would be the top with the basket in its upright position, as in Fig. 1. After the basket is filled a suitable bottom inclosure is attached to said basket. By this means the fruit lies in regular order in uniform rows at the openings at the top of the basket when in its upright position in a more uniform and attractive condition than could be accomplished by filling the basket through the top, and the same is much more quickly and easily accomplished than could be done if the cleats c were not employed.

Having thus described my invention, what I claim as new, and desire to secure by Letters Patent of the United States, is—

1. A basket for marketing fruit, open at the bottom and having a series of openings through its closed top, said top being provided with suitable cleats on its under side for separating the rows of fruit, and a bottom closure for attachment to the open bottom of the basket after it is filled with fruit, substantially as set forth.

2. A basket for marketing fruit, open at the bottom and having a series of openings through its closed top, said top being provided with pendent cleats or ribs for separating the rows of fruit, tarlatan or other suitable netting in said openings, and a bottom closure for attachment to the open bottom of the basket after it is filled with fruit, substantially as set forth.

In testimony to the foregoing I have hereunto subscribed my name in the presence of two witnesses.

MALCOLM B. WILLIAMS.

Witnesses:
 MARIAN LONGYEAR,
 LUCIUS C. WEST.